Dec. 17, 1968   G. J. YEREMIAN   3,416,523
NON-ADHERENT DRESSING
Filed Dec. 6, 1966

INVENTOR.
GEORGE J. YEREMIAN
BY
David B. Ehrlinger

3,416,523
NON-ADHERENT DRESSING

George J. Yeremian, Greenwood, S.C., assignor to Parke, Davis & Company, Detroit, Mich., a corporation of Michigan
Filed Dec. 6, 1966, Ser. No. 599,573
3 Claims. (Cl. 128—156)

This invention relates to surgical dressings and more particularly to a stabilized non-adherent dressing of an improved type.

Prior to the present invention, available dressings have in general failed to provide the intended free, non-adherent release from the healing wound surface. One conventional dressing of the type in question, while not truly non-adherent, nevertheless achieves some improvement with a construction in which the wound is contacted by a smooth perforated plastic film-gauze laminate. One such dressing is shown in U.S. Patent No. 2,923,298. More recently, a material with superior non-adherent properties has been developed. This superior material, referred to below in detail, is a bonded laminate comprising needled webs of neutral organic plastic resin fiber and cellulosic material. One face of the laminate is composed of porous resin and this serves as the non-adherent contact surface for the wound. One difficulty with this laminated material, however, is that it has a relatively low abrasion resistance. Also, it tends to delaminate when employed in certain types of dressing, particularly under stress of normal wear. A consequence of abrasion and delamination is that fibrous particles and other small particles can become dislodged from the dressing onto the wound site from which their later removal may be difficult and even distressing.

It is an object of the present invention therefore to provide an improved non-adherent surgical dressing which is stabilized against abrasion, delamination, etc.

It is also an object of the invention to provide an economical non-adherent surgical dressing which can be efficiently made in large volume.

Another object is to provide a surgical dressing which can be safely applied to the wound site and kept there for indefinite periods under widely varying conditions of use without risk of introducing extraneous debris or particles to the wound site.

Still another object is to provide an improved surgical dressing which can readily be manufactured and packaged and thereafter distributed and used under sterile conditions, all the while retaining its intended structural integrity.

Figure 1:
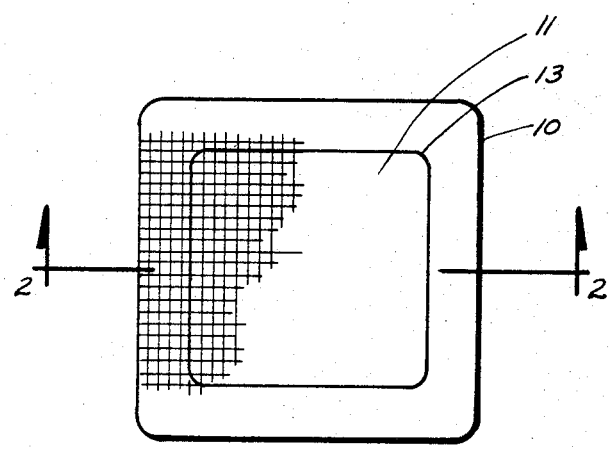
Figure 2:
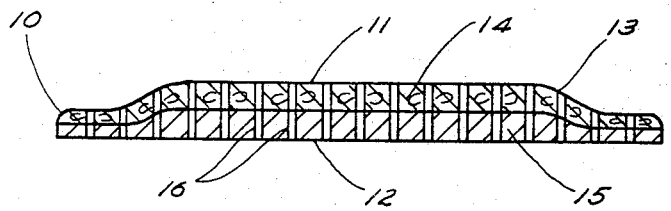

Other objects, advantages, and purposes will be seen in the following description in reference to the accompanying drawings in which:

FIG. 1 is a plan view of a dressing according to the invention showing a non-adherent pad; and FIG. 2 is a diagrammatic cross-section of the dressing of FIG. 1 taken on line 2—2.

As seen in the drawing the dressing 10 of the invention comprises a laminated pad having an absorbent surface 11 and a non-adherent surface 12. The absorbent surface 11 is constructed with a shoulder 13 and optionally has rounded corners. The laminate comprises two layers: a cellulosic layer 14 and a resin fiber layer 15. The two layers 14 and 15 are joined by needled resin fibers 16. The pad can be any of a wide variety of sizes, shapes, thicknesses, etc., for application to various parts of the body, depending on particular requirements. The cellulosic layer is one having moisture absorption properties and is composed of a non-woven mat or web of natural fibers such as cotton, artificial fibers such as rayon and mixtures of such fibers; the layer may also contain other fibers or adjuvants such as an inert thermoplastic olefinic bonding fiber, e.g., polypropylene. The resin fiber layer for direct application to the wound site is one permitting free flow to moisture and yet inert and compatible with the wound surface. Any of various resins or mixtures of resins which meet these requirements and which are thermoplastic, as will be hereinafter described, will be satisfactory. The polyolefins such as polyethylene, polypropylene, etc., and other similar inert resin materials are suitable. Polypropylene is preferred for its ability to withstand steam sterilization. Other absorbent layers such as cellulose wadding, open weave textile and the like can if desired be included with the cellulosic layer. The cellulosic layer and the resin fiber layer in the pad according to the invention are secured together by needling and heat fusion. In the needling operation used to produce pads of this type, the somewhat loose laminate is processed through a needling machine wherein the needles are injected through the laminate causing the ensnared resin fibers to pass through the cellulosic layer at random spaced points and the needled fibers 16 are heat fused in place. Fusion of the needled laminate is accomplished conveniently by passing the needled lamiate through pressure rolls with the resin fiber layer in direct contact with the heat surface to cause the fibers to soften, merge and rearrange to a substantially flat, smooth integral porous surface with the needled fibers likewise merged into the compressed cellulosic mat. Upon cooling, immediately after leaving the pressure rolls, the resin hardens and the compressed webs are thus transformed into a single integrated laminate having the characteristics of a smooth durable dense blanket structure.

For purposes of illustration, a suitable needled, pressure-secured pad can be made using a sheet of cellulose wadding (14 lbs./ream) laid over non-woven web of rayon fibers (1⅛" length, 3 denier). A like web of non-woven polypropylene fibers is next laid over the first web (to provide a weight ratio per unit area of 46 parts polypropylene, 21 parts wadding and 33 parts rayon) and the resulting laminate weighing about 4¾ ounces per square yard is passed through a needling machine having 9 barbs per needle to give between 100–120 needle perforations per square inch through the laminate. The laminate is then fed through heat rolls for average exposure of ½ second to 20 pounds per square inch and temperatures above 270° F. sufficient to fuse the resin and provide a smooth surface with non-adherent characteristics. The resulting laminated pad material which is an improvement over prior non-adherent materials is nevertheless unsatisfactory, as indicated above, because of delamination, low resistance to abrasion, etc.

According to the present invention, however, freedom from fraying, loose fibers, delamination and the like is advantageously obtained by incorporating from about 15 to 30% by weight of inert thermoplastic resin in the cellulosic layer of the mentioned laminate and forming a peripheral shoulder on the absorbent face of the pad by heat and pressure means. The resin may be incorporated in the layer in any convenient way, for example, by covering over the face with a suitable non-woven web of thermoplastic resin fibers or by further needling the web to build the required proportion of resin into the cellulosic layer or by selecting originally for construction of the laminate a cellulosic layer having blended therein a sufficient quantity of resin fibers to provide the required proportion of resin, or by combinations of these procedures, or by other similar procedures. Higher proportions of resin can be used for stabilizing the cellulosic layer but such may unduly detract from the desired absorbent, and hence non-adherent, properties of the pad. Also, the use of larger amounts of resin is economically undesirable. The resin selected for stabilization will usually be the same as that used for the resin fiber layer. However, other resins having similar properties will also be suitable. Polypropylene resin is a preferred resin for the purpose. The shoulder can be formed in the pad by any convenient forming means. For example, this may be done by pressing between heated stamping dies of suitable configuration to provide increased compression in the peripheral portion and little if any compression at the center of the pad with the result that the edges and shoulder of the pad are fusibly set whereas the central portion of the pad can desirably receive a superficial fusing of any loose fibers. The shoulder can also be applied by passing the pad edgewise through opposed embossing wheels with the wheel contacting the absorbent face being heated to impress a permanent set at the shoulder. Pressure and heat means applied in this way serve to eliminate loose fibers and to impart a desirable structural rigidity to the pad without causing undue stiffness. Importantly, also, the shoulder eliminates delamination. Optionally the absorbent surface of the pad can be treated as by spraying or other suitable applying means, with a binder solution such as methyl cellulose solution (preferably colored to denote a color difference between the two faces of the pad for identification purposes) sufficient to assist in controlling loose fibers and preventing against abrasion.

I claim:

1. A non-adherent dressing for application to a wound site comprising a laminated pad of a moisture absorbent non-woven cellulosic layer face to face with a porous layer of thermoplastic resin fibers some of which fibers are needled through the layers and bonded therein by heat fusion and pressure means sufficient to secure the layers together, the cellulosic layer having a marginal shoulder constituting a peripheral area of increased compression, the shoulder being bonded in position by heat fusion means.

2. A dressing according to claim 1 wherein the cellulosic layer comprises a non-woven rayon web and the resin fibers are polypropylene fibers.

3. A dressing according to claim 1 wherein the absorbent face of the pad is treated with methyl cellulose sufficient to act as a binder.

References Cited

UNITED STATES PATENTS

| | | | |
|---|---|---|---|
| 2,923,298 | 2/1960 | Dockstader et al. | 128—296 |
| 3,122,141 | 2/1964 | Crowe | 128—296 |
| 3,229,691 | 1/1966 | Crowe | 128—156 |
| 3,331,728 | 7/1967 | Lane | 161—112 |

ADELE M. EAGER, *Primary Examiner.*

U.S. Cl. X.R.

128—296; 161—112